United States Patent
Fischer et al.

(10) Patent No.: US 11,326,466 B2
(45) Date of Patent: May 10, 2022

(54) SUPPLY SYSTEM OF A SEALING SYSTEM OF A TURBOMACHINE AND TURBOMACHINE HAVING A SEALING AND SUPPLY SYSTEM

(71) Applicant: MAN Energy Solutions SE, Augsburg (DE)

(72) Inventors: Simon Fischer, Oeschgen (CH);
Marcel Rosenberger, Stallikon (CH);
Francesco Mecchia, Zürich (CH);
Michael Betschart, Vitznau (CH)

(73) Assignee: MAN Energy Solutions SE, Augsburg (DE)

( * ) Notice: Subject to any disclaimer, the term of this patent is extended or adjusted under 35 U.S.C. 154(b) by 240 days.

(21) Appl. No.: 16/564,292

(22) Filed: Sep. 9, 2019

(65) Prior Publication Data
US 2020/0095881 A1    Mar. 26, 2020

(30) Foreign Application Priority Data
Sep. 26, 2018   (DE) .......................... 102018123728.6

(51) Int. Cl.
*F01D 11/04*   (2006.01)
*F01D 11/10*   (2006.01)

(52) U.S. Cl.
CPC .............. *F01D 11/10* (2013.01); *F01D 11/04* (2013.01); *F05D 2240/55* (2013.01)

(58) Field of Classification Search
CPC ......... F01D 11/04; F01D 11/10; F04D 29/104
See application file for complete search history.

(56) References Cited

U.S. PATENT DOCUMENTS

| 5,412,977 A * | 5/1995 | Schmohl | ............. F04D 27/0292 |
| | | | 277/318 |
| 2018/0298775 A1* | 10/2018 | Suter | ...................... B01D 45/14 |

FOREIGN PATENT DOCUMENTS

| DE | 42 25 642 | 7/1993 | |
| DE | 601 13 894 | 5/2006 | |
| EP | 1 914 387 | 4/2008 | |
| EP | 1914387 A1 * | 4/2008 | ............ F01D 11/003 |

(Continued)

OTHER PUBLICATIONS

Search Report dated Feb. 23, 2021 issued in French Patent Application No. 1910050.

(Continued)

*Primary Examiner* — Sabbir Hasan
(74) *Attorney, Agent, or Firm* — Cozen O'Connor

(57) ABSTRACT

A supply system of a sealing system of a turbomachine, wherein the sealing system which are suppliable with a seal gas. The supply system comprises, for each sealing sub-system, four seal gas lines: a first seal gas supply line, via which process gas extracted from the turbomachine is suppliable as first seal gas to the respective sealing sub-system. A second seal gas supply line, via which second seal gas is suppliable to the respective sealing sub-system. A seal gas discharge line, via which the first seal gas and the second seal gas are dischargeable from the respective sealing sub-systems. A safety discharge line, which is closed during the normal operation and open in the event of a fault, to discharge at least one part of the first seal gas and of the second seal gas from the respective sealing sub-system via the same in the event of a fault.

7 Claims, 4 Drawing Sheets

(56) References Cited

FOREIGN PATENT DOCUMENTS

EP          2 977 563        1/2016
WO    WO 2005/090793    9/2005

OTHER PUBLICATIONS

Office Action for the corresponding German Patent Application No. 10 2018 123 728.6.

* cited by examiner

SUPPLY SYSTEM OF A SEALING SYSTEM OF A TURBOMACHINE AND TURBOMACHINE HAVING A SEALING AND SUPPLY SYSTEM

BACKGROUND OF THE INVENTION

1. Field of the Invention

The invention relates to a supply system of a sealing system of a turbomachine. The invention, furthermore, relates to a turbomachine having a sealing system and a supply system.

2. Description of Related Art

In turbomachines, such as for example turbocompressors, sealing systems are employed for sealing a rotor of the turbomachine relative to a stator of the turbomachine, which can comprise dry gas seals and oil film seals. Accordingly a dry gas seal of a turbomachine is known from EP 2 977 563 A1. Seal gas can be supplied to a sealing gap to be sealed via a bore in the stator and via a gas space, which is provided by the dry gas seal.

Typically, a sealing system of a turbomachine, which serves for sealing a rotor relative to a stator, comprises at least two sealing sub-systems, which act on opposite ends of a shaft of the rotor. In the region of each sealing sub-system, multiple seals can be employed, for example dry gas seals, labyrinth seals, and piston ring seals.

The sealing sub-systems of a sealing system of a turbomachine have to be supplied with seal gas. A supply system serves for supplying seal gas to the seals of the sealing sub-systems of the sealing system. By way of the supply system, the seals of each sealing sub-system can be supplied with seal gas.

SUMMARY OF THE INVENTION

Supply systems known from practice have a relatively complex structure. There is a need to provide a supply system of a sealing system of a turbomachine with a simpler structure. One aspect of the invention present here is a new type of supply system of a sealing system of a turbomachine and a turbomachine having a sealing and supply system.

The supply system according to one aspect of the invention comprises for each sealing sub-system of the sealing system exclusively the following four seal gas lines: a) a first seal gas supply line, via which process gas extracted from the turbomachine is suppliable as first seal gas to the respective sealing sub-system, b) a second seal gas supply line, via which as second seal gas preferentially nitrogen is suppliable to the respective sealing sub-system, c) a seal gas discharge line, via which the first seal gas and the second seal gas are dischargeable from the respective sealing sub-system, and d) a safety discharge line, which is closed during normal operation and open in the event of a fault, in order to discharge at least one part of the first seal gas and of the second seal gas from the respective sealing sub-system in the event of a fault. In the supply system according to the invention, the number of the seal gas lines utilised for each sealing sub-system is minimised. By way of this, the structure of the supply system can be simplified.

According to an advantageous further development, the supply system comprises a differential pressure measurement system via which a differential pressure between the pressure in the safety discharge line and the pressure in the second seal gas supply line is measurable. With the help of this differential pressure system, the presence of a case of a fault can be securely and reliably deduced.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a supply system of a sealing system of a turbomachine and to a turbomachine having a sealing system and a supply system.

Figure 1:
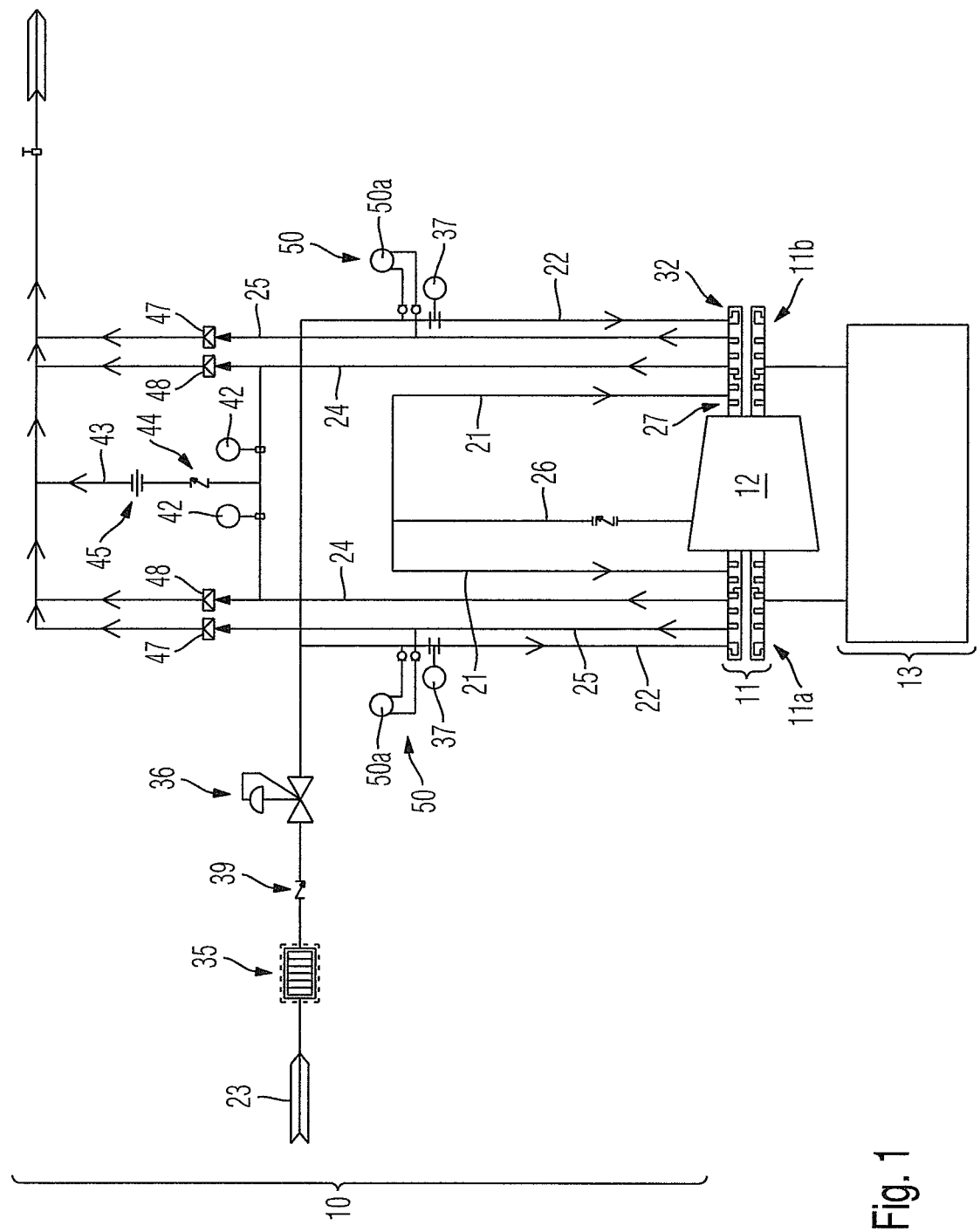
FIG. 1 is a block diagram of a supply system of a sealing system of a turbomachine together with the turbomachine and the sealing system.

FIG. 1 shows a block diagram of a supply system 10 for a sealing system 11 of a turbomachine 12, wherein FIG. 1, furthermore, shows a washing system for the sealing system 11 of the turbomachine 12 in a schematised manner.

The sealing system 11 serves for sealing a rotor 14 of the turbomachine 12 relative to a stator 15 of the turbomachine 12, wherein in the shown exemplary embodiment the sealing system 11 shows two sealing sub-systems 11a, 11b, which have an identical structure and which act on opposite ends of a shaft of the rotor 14 of the turbomachine 12 in order to seal the rotor 14 of the turbomachine 12 relative to the stator 15 of the same.

Figure 4:
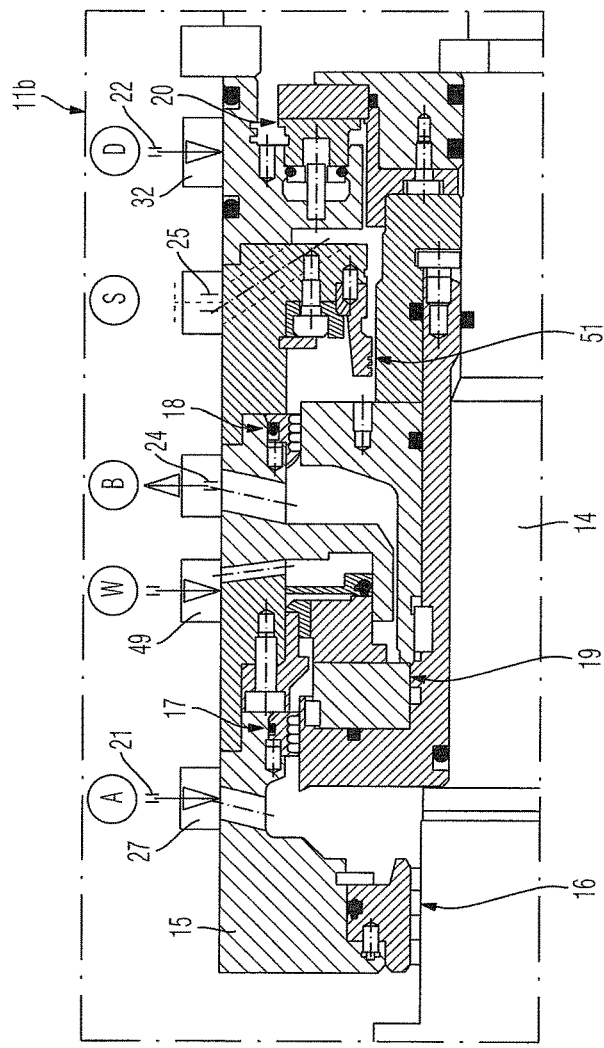
FIG. 4 is a detail of FIG. 3.

FIG. 4 shows the structure of the sealing sub-system 11b in detail, in order to seal the rotor 14 of the turbomachine 12 relative to the stator 15 of the turbomachine 12. The sealing system 11a has a structure that is identical with regard to the assemblies.

Figure 2:
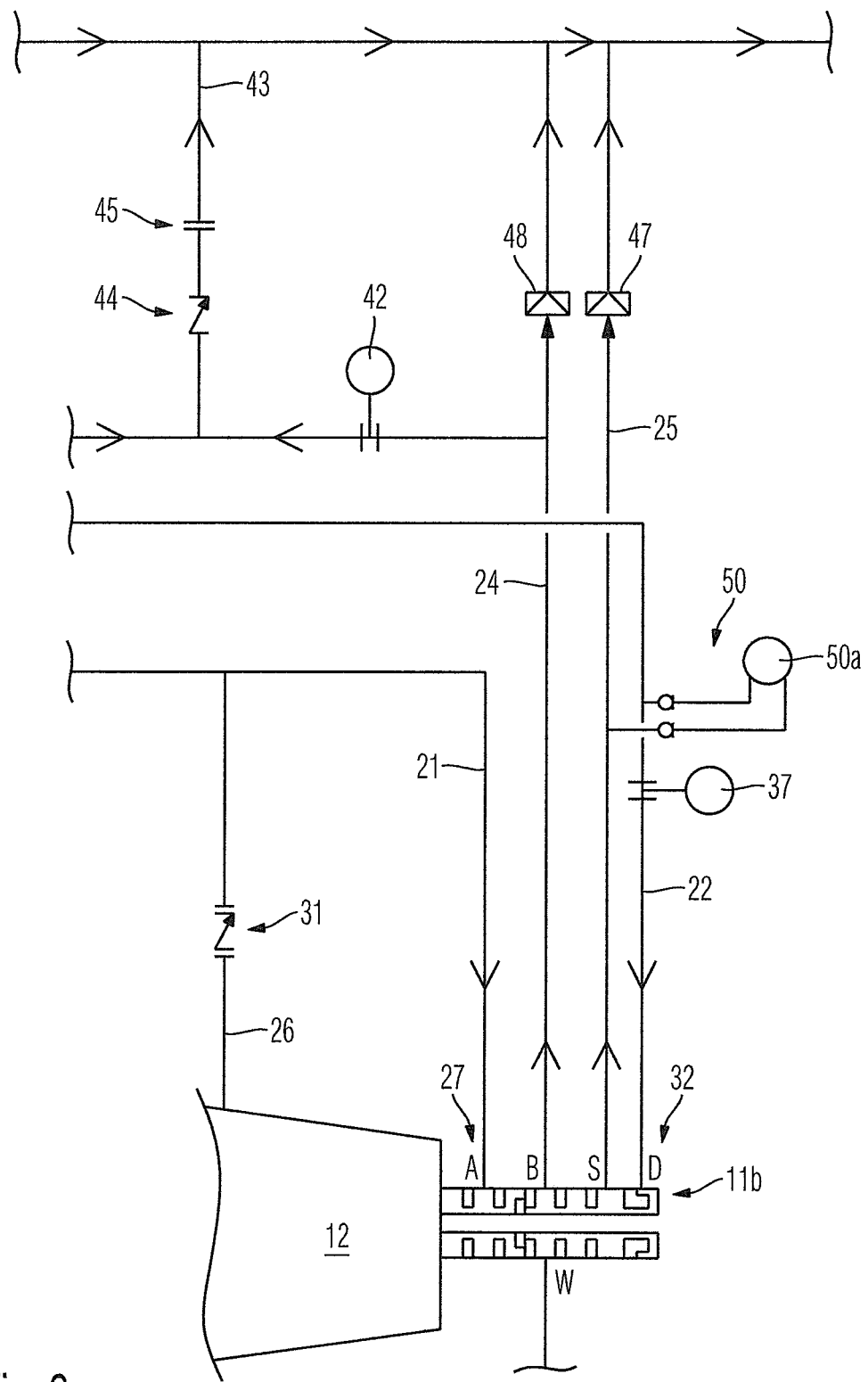
FIG. 2 is an extract from the block diagram of FIG. 1.

The sealing sub-system 11b of FIG. 4 comprises multiple seals. Accordingly, FIG. 4 shows that the sealing sub-system 11b comprises four contactless seals, namely a first contactless seal 16, a second contactless seal 17, a third contactless seal 18, and a fourth contactless seal 51, which preferentially are all embodied as labyrinth seals. In addition to these four contactless seals 16, 17, 18 and 51, the sealing sub-system 11b of FIG. 2 comprises two contact seals, namely a first contact seal 19 and a second contact seal 20. The first contact seal 19 is arranged between the second contactless seal 17 and the third contactless seal 18. The fourth contactless seal 51 is positioned between the third contactless seal 18 and the second contact seal 20. The contact seals 19 and 20 are preferentially sliding ring seals.

The seals 16, 17, 18, 19, 20, and 51 are gas seals.

The supply system 10 according to the invention now serves for the seal gas supply of the seals 16, 17, 18, 19, 20, and 51 of each sealing sub-system 11a, 11b of the sealing system 11 of the turbomachine 12.

The supply system 10 exclusively comprises the following four seal gas lines for each sealing sub-system 11a, 11b:

A first seal gas line of the respective sealing sub-system 11a, 11b, is a first seal gas supply line 21. The first seal gas supply line 21 serves for supplying process gas extracted from the turbomachine as first seal gas in the direction of the respective sealing sub-system 11a, 11b. Supplying the first seal gas can be effected by way of an external gas filter system or without such a gas filter system.

A second seal gas line of the respective sealing sub-system 11a, 11b, is a second seal gas supply line 22. The second seal gas supply line 22 serves for supplying a second seal gas, in particular nitrogen, in the direction of the respective sealing sub-system 11a, 11b. The second seal gas, preferentially the nitrogen or air, is provided or kept ready by a seal gas source 23.

A third seal gas line of the respective sealing sub-system 11a, 11b, is a seal gas discharge line 24. By way of the seal gas discharge line 24, first seal gas and second seal gas can be discharged from the respective sealing sub-system 11a, 11b.

A fourth seal gas line of the respective sealing sub-system 11a, 11b, is a safety discharge line 25. The safety discharge line 25 is normally closed and open in the event of a fault, in order to discharge in the event of a fault, at least one part of the first seal gas and of the second seal gas from the respective sealing sub-system 11a, 11b via the safety discharge line 25.

Figure 3:
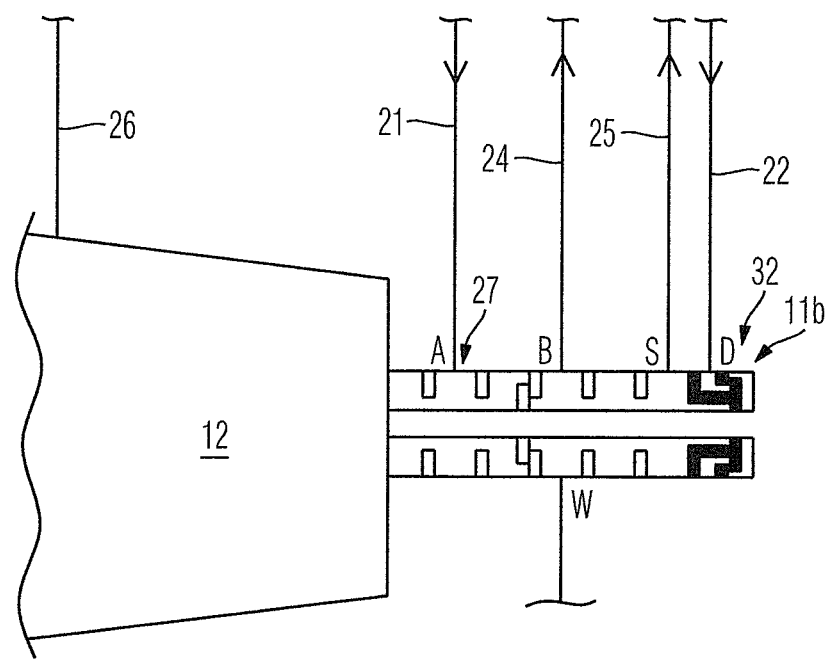
FIG. 3 is an extract from FIG. 2.

As already explained, process gas can be extracted from the turbomachine 12 via the respective first seal gas supply line 21 and supplied to the respective sealing sub-system 11a, 11b. According to FIG. 2, the process gas is branched off from the turbomachine 12 in the region of a branch 26, wherein the branch 26 merges into the seal gas supply lines 21, which leads to the two sealing sub-systems 11a, 11b. With an opening 27 (see FIG. 3), the respective first seal gas supply line 21 opens in the region of the respective sealing sub-system 11a, 11b. A non-return valve 31 can be optionally integrated in the branch 26.

An optional filter 35 and/or an optional pressure regulating valve 36 and/or an optional flow meter 37 is/are integrated in the respective second seal gas supply line 22 between the seal gas source 23 and a mouth 32 of the second seal gas supply line 22 to the respective sealing sub-system 11a. Between seal gas source 23 and filter 35 and/or between filter 35 and/pressure regulating valve 36, a non-return valve 39 can be integrated in the second seal gas supply line 22, wherein in FIG. 1 merely one non-return valve 39 between filter 35 and pressure regulating valve 36 is shown.

In the seal gas discharge line 24, via which first seal gas and second seal gas from the respective sealing sub-system 11a, 11b can be discharged, at least one bursting disc 48 bursting in the event of overpressure or a safety valve opening in the event of overpressure is integrated. The seal gas discharge lines 24 of both sealing sub-systems 11a, 11b merge into a common discharge line 43, in which a non-return valve 34 and/or a choke 45 can be integrated.

During t normal operation, the seal gas, namely both the first seal gas and also the second seal gas, which flows via the seals 17, 18, 19, 20, and 51 of the respective sealing sub-system, is dischargeable via the respective seal gas discharge line 24.

In the safety discharge line 25, via which the seal gas is dischargeable from the respective sealing sub-system 11a, 11b in the event of a fault, a bursting disc 47 bursting in the event of overpressure or a safety valve opening in the event of overpressure is integrated, which bursts in the event of overpressure and thus opens the safety discharge line 25 in the event of a failure.

As is best evident from FIG. 4, the first seal gas supply line 21 carries the first seal gas, which is process gas extracted from the turbomachine 12, in the direction of the first contactless seal 16 and in the direction of the second contactless seal 17, wherein a first part of the first seal gas flows via the first contactless seal 16 and a second part of the seal gas via the second contactless seal 17 in the direction of the first contact seal 19. The first part of the first seal gas, which flows via the first contactless seal 16, is greater than the second part of the first seal gas, which flows via the second contactless seal 17, wherein the first part of the first seal gas, which flows via the first contactless seal 16, amounts to at least 90%, preferably at least 95%, particularly preferably at least 97% of the first seal gas.

By way of the second seal gas supply line 22, the second seal gas can be supplied to the second contact seal 22 of the respective sealing system 11a, 11b namely in such a manner that a part of the second seal gas flows via the second contact seal 20 in the direction of the fourth contactless seal 51 and in the direction of the third contactless seal 18. Another part of the second seal gas flows in the direction of a bearing pedestal on a side of the sealing system 11 facing away from the compressor.

In the event of a fault, the fourth contactless seal 51 attaches to the rotor 14.

By way of the seal gas discharge line 24, seal gas can be discharged, namely between the first contact seal 19 and the third contactless seal 18. By way of the safety discharge line 25, seal gas can likewise be discharged in the event of a fault, namely between the seal 20 and the seal 51. The gas discharged via the safety discharge line is conducted by the second seal gas supply line 22 and a part of the gas flowing via the seal 51 in the event of a fault, in the safety discharge line 25.

By way of a flow meter 42, a sticking of the first contact seal 19 in the open position can be detected with the rotor 14 in the stationary state. In this case, this seal can be freed by applying a pressure shock via the mouth 49.

The supply system 10 provides for each sealing sub-system 11a, 11b a differential pressure measurement system 50, with the help of which a pressure differential between the pressure in the respective safety discharge line 25 and the pressure in the second seal gas supply line 22 can be measured. The respective differential pressure measurement system 50 comprises a differential pressure sensor 50a, which with a first measurement point is coupled to the respective safety discharge line 25 and with a second measurement point is coupled to the respective second seal gas supply line 22. By way of the evaluation of the differential pressure measured by the respective differential pressure measurement 50, an event of a fault in the respective sealing sub-system 11a, 11b can be deduced.

In addition to the differential pressure measurement systems 50, further pressure sensors can act on the seal gas lines 21, 22, 24 and 25, to determine the pressure in the respective seal gas line, such as for example a pressure in the seal gas discharge line 24, a pressure in the second seal gas supply line 22, and a pressure in the safety discharge line 25 in the region of the respective bursting disc 47 or a pressure in the seal gas discharge line 24 in the region of the respective bursting disc 48.

The supply system 10 of a sealing system 11 of a turbomachine according to one aspect of the invention serves for supplying the sealing system 11, namely the sealing sub-systems 11a, 11b of the same with seal gas. In the region of the respective sealing sub-system 11a, 11b, the supply system 10 exclusively utilises two seal gas supply lines 21 and 22, a seal gas discharge line 24 and a safety discharge line 25. By way of this, a particularly simple structure of the supply system 10 is made possible. The supply system 10 according to one aspect of the invention supplies the individual seals of the respective sealing sub-system 11a, 11b with seal gas and discharges seal gas from the respective sealing sub-system 11a, 11b.

As already explained, a washing system 13 for the sealing sub-systems 11a, 11b of the turbomachine 12 is additionally shown. With the help of the washing system, a washing agent can be supplied in particular to the first contact seal 19 for cleaning the same. In particular when the seal 19 of the respective sealing sub-system 11a, 11b is washed, the washing agent is again discharged via machine drains or the like.

Thus, while there have shown and described and pointed out fundamental novel features of the Mention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A supply system of a sealing system of a turbomachine, wherein the sealing system comprises at least two sealing sub-systems configured to seal a rotor of the turbomachine relative to a stator of the turbomachine, wherein each of the at least two sealing sub-systems comprises multiple seals, configured to be supplied with a seal gas, wherein the supply system for each of the at least two sealing sub-systems exclusively comprises four seal gas lines:
   a first seal gas supply line configured to supply process gas extracted from the turbomachine as a first seal gas to a respective sealing sub-system;
   a second seal gas supply line configured to supply a second seal gas to the respective sealing sub-system;
   a seal gas discharge line configured to be dischargeable from the respective sealing sub-system the first seal gas and the second seal gas; and
   a safety discharge line, which is closed during normal operation and open in a fault and configured to discharge at least one part of the first seal gas and of the second seal gas from the respective sealing sub-system.

2. The sealing system according to claim 1, further comprising:
   a differential pressure measurement system configured to measure a differential pressure between a pressure in the safety discharge line and a pressure in the second seal gas supply line.

3. The sealing system according to claim 2, wherein a differential pressure sensor of the differential pressure measurement system is coupled with a measurement point to the safety discharge line and with a measurement point to the second seal gas supply line.

4. The sealing system according to claim 1, further comprising at least one of:
   a pressure regulating valve integrated in the second seal gas supply line between a seal gas source and a mouth to the respective sealing sub-system and
   a filter integrated in the second seal gas supply line between the seal gas source and the mouth to the respective sealing sub-system.

5. The sealing system according to claim 1, further comprising one of:
   a bursting disc integrated in the seal gas discharge line and configured to burst in an overpressure event and
   a safety valve integrated in the seal gas discharge line.

6. The sealing system according to claim 1, further comprising one of:
   a bursting disc integrated in the safety discharge line and configured to burst in an overpressure event and
   a safety valve integrated in the safety discharge line.

7. The sealing system according to claim 1, wherein the second seal gas is nitrogen.

* * * * *